June 24, 1930.  J. L. AHERN ET AL  1,767,164
PISTON AND ROD PACKING
Filed Sept. 4, 1928  2 Sheets-Sheet 2

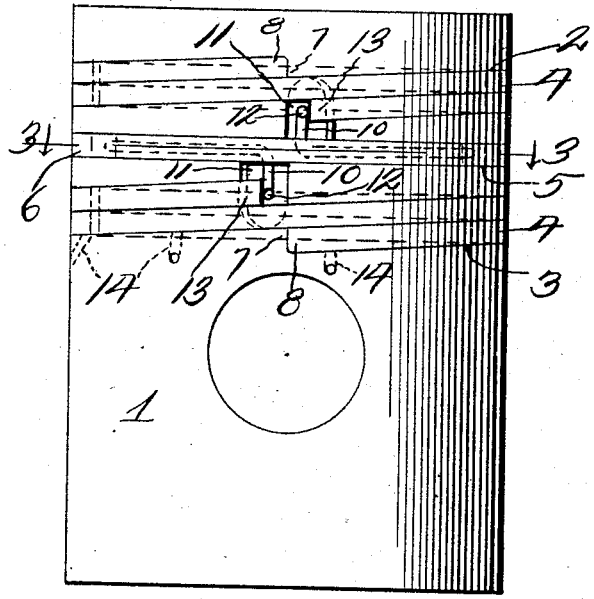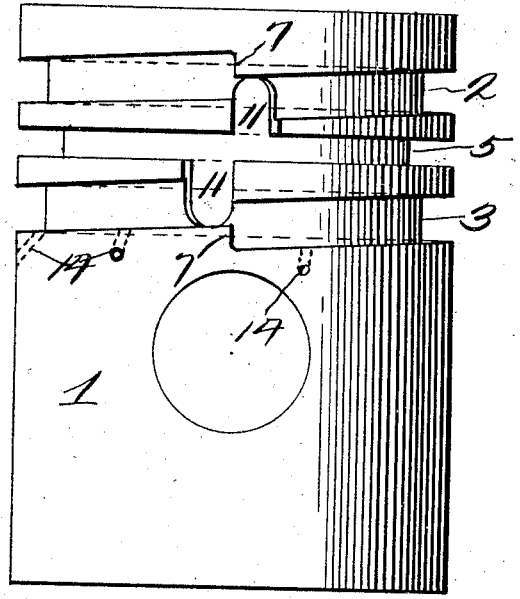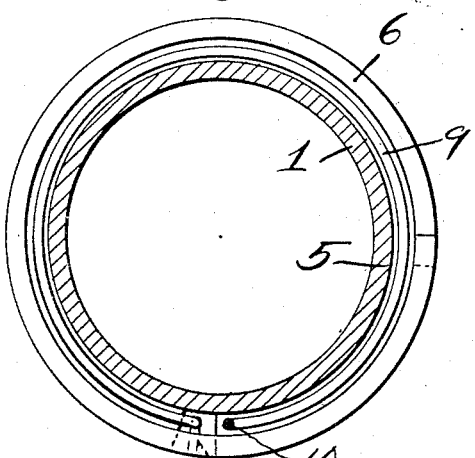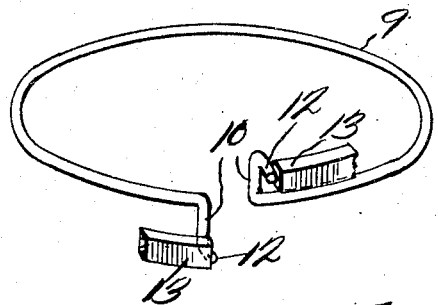

Inventors
J. L. Ahern and
L. G. Ledger
By Philip A. Ferrell
Attorney

Patented June 24, 1930

1,767,164

UNITED STATES PATENT OFFICE

JAMES LEO AHERN AND LETCHER GILBERT LEDGER, OF NEW ORLEANS, LOUISIANA

PISTON AND ROD PACKING

Application filed September 4, 1928. Serial No. 303,912.

The invention relates to piston and rod packings and has for its object to provide a piston packing comprising spaced helical packings disposed in spaced helical grooves of a piston and having the ends of their outer convolutions in engagement with shoulders in the grooves and an expansible member cooperating with the ends of the inner convolutions whereby the ends of the outer convolutions are maintained in engagement with the shoulders.

A further object is to provide a piston packing comprising spaced helical packing rings in spaced grooves and having means for preventing rotation in one direction, an expansible ring in a groove of the piston between the piston ring grooves and provided with arms extending into the ring grooves and engaging the inner convolutions of the rings for maintaining the same in cooperative relation with their limiting means. Also to provide a split packing ring in the groove in which the expansible ring is disposed.

A further object is to provide, in combination with helical packing rings disposed in grooves in spaced relation in a piston, an expansible annular member disposed in a channel between the grooves and having arms extending into the ring grooves and engaging the inner convolutions of the helical packing rings for normally imparting circumferential pressure on the rings for maintaining the outer convolutions of the rings in engagement with limiting means and exerting an expansible power on the helical rings. Also to provide an expansible piston ring in the groove in which the expansible annular member is disposed.

A further object is to provide the ends of the expansible annular member with upwardly and downwardly extending arms extending through passages of communication from the central groove to the packing ring grooves, and to provide said arms with outwardly extending arms engaging the ends of the inner convolutions of the spaced helical packing members.

A further object is to form the groove in which the expansible annular member is disposed deeper than the packing ring groove as well as the passage of communication between the grooves, whereby the arms which extend upwardly and downwardly at the ends of the annular member will be disposed within the circumference of the helical packing member grooves, thereby allowing the use of a standard packing ring in the intermediate groove, and the use of helical packing members of substantially the same thickness.

A further object is to provide a piston having a helical piston groove therein thereby forming shoulders and a helical piston ring packing disposed in the groove and with which the shoulders cooperate for limiting the circumferential movement of the piston ring.

A further object is to provide means cooperating with the ring, preferably in the form of a pin engaging an aperture for holding the ring against circumferential movement.

A further object is to provide the piston with spaced independent helical grooves having helical piston rings therein, interengagement means between the rings and the piston and shoulders carried by the grooves for limiting circumferential movement of the rings but allowing expansion and contraction of the rings.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the piston showing the packing applied thereto.

Figure 2 is a side elevation of the piston with the packing rings removed to better show the groove structure.

Figure 3 is a horizontal sectional view through the piston taken on line 3—3 of Figure 1.

Figure 4 is a detail perspective view of a portion of one side of the piston.

Figure 5 is a perspective view of the expansible annular member, showing the same cooperating with the ends of the adjacent convolutions of the helical packing rings.

Figure 6 is a perspective view of one of the helical packing rings showing the same in an expanded position before compression and application to the piston.

Figure 7:
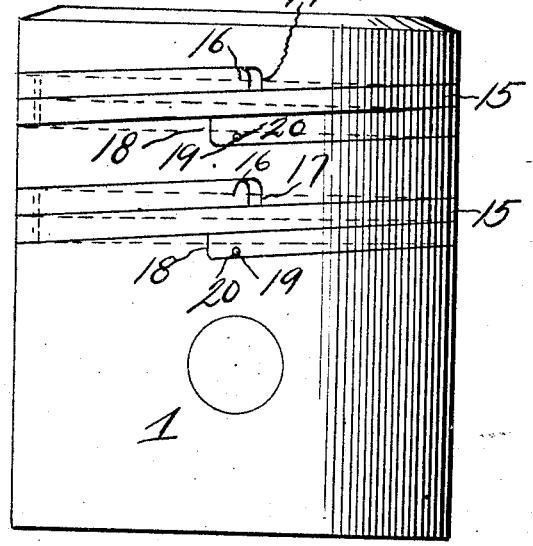
Figure 7 is a view in elevation of a modified form of piston and piston packing showing the packing rings independent of each other.
Figure 8:
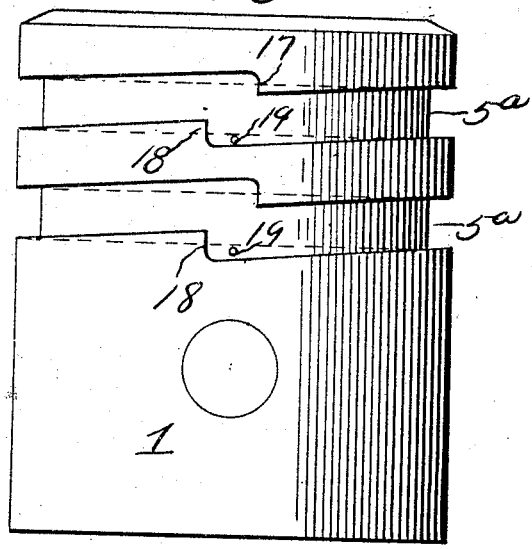
Figure 8 is a view in elevation of the piston with the packing rings removed to show the helical groove structure.
Figure 9:
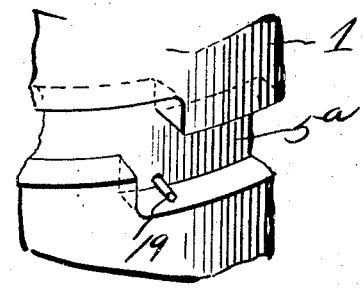
Figure 9 is a detail perspective view of a portion of the piston, showing the pin in one of the grooves for interengaging with the ring.

Referring to the drawings, and particularly to Figures 1 to 6 inclusive, the numeral 1 designates a conventional form of piston of the type used in internal combustion engines, and which piston, preferably adjacent its upper end, is provided with spaced piston ring grooves 2 and 3 for the reception of helically shaped piston rings 4, and with an intermediate groove 5, deeper than the grooves 2 and 3 for the reception of a conventional form of piston ring 6.

The helical spaced piston rings 4 are of a compressible type, whereby when they are compressed and placed in the grooves 2 and 3 their expansive action will maintain the same in close engagement with opposite sides of the grooves and the convolutions in engagement with each other for insuring a close fit at all times and preventing escape of gases, or other matter between piston grooves and rings. Grooves 2 and 3 have their outer sides provided with shoulders 7, against which the ends 8 of the outer convolutions of the ring engage for limiting rotation of the rings incident to the expansible action of the annular spring 9 disposed in the deep grooves 5, intermediate the piston ring grooves 2 and 3. The ends of the annular member 9 terminate in upwardly and downwardly extending arms 10, which are disposed in the recesses 11 forming passages of communication between the piston grooves 2 and 3 and terminate in outwardly extending arms 12, which engage the inner ends 13 of the piston rings. Recesses 11 have their ends preferably round thereby allowing the recesses to be formed with a conventional milling tool. The expansive action of the annular spring 9 on the inner ends 13 of the rings exert circumferential pressure on the rings, and as the ends 8 of the rings are in engagement with the shoulders 7, the helical rings are expanded for insuring a close engagement with the cylinder, and for taking up wear as it develops during the operation of the piston.

By providing the relatively deep groove 5 and the recesses 11, it is obvious that the packing ring 6 may be of a standard split construction and relatively thick and the arms 12 will be the only portions of the expansible spring 9 which will extend into the channels 2 and 3, therefore it will be seen that the packing rings 4 may be of a standard thickness. Recesses 11 are sufficiently wide as clearly shown in Figures 1 and 2 to allow freedom of movement of the arms 12 in cooperating with the ends 13 of the helical packing members for taking up wear and expanding the rings. Another advantage of providing a relatively deep channel 5 is that the helical packing rings 4 may be placed in position, and after which the expansible spring 9 may be placed in the channel 5 and properly adjusted for cooperating with the ends 13 of the rings before the piston ring 6 is finally placed in position, thereby providing a structure which will allow the rings to be easily and quickly assembled or removed. The groove may be provided with oil drain apertures 14, through which oil may drain back to the crank case of the machine, and these apertures may be placed in any suitable position.

Figure 10:
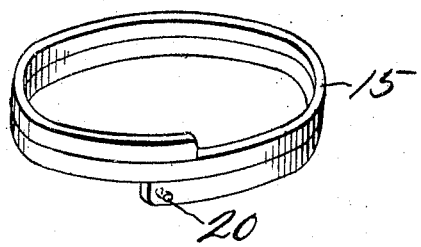
Figure 10 is a perspective view of the ring showing the same in compressed position.

Referring to Figures 7 to 10 inclusive, the piston structure is substantially the same, however in this form helical packing rings are used, preferably two, and which helical packing rings are of the compressible expansible type, whereby when said packing rings 15 are placed in the grooves 5ª of the piston and within a cylinder they will closely fit the walls of the grooves as well as conform to the cylinder. The piston ring shown in Figure 10 is in compressed condition. It will be noted in this form the rings are entirely independent of each other and have their ends 16 in spaced relation to the shoulders 17 and their other ends in abutting relation with the shoulders 18 thereby allowing room for expansion and contraction of the rings.

To maintain the ends 16 of the rings out of engagement with the shoulders 17 whereby the rings will have freedom of play at all times, pins 19 are provided in the grooves 5ª and which pins extend through apertures 20 in the rings, therefore it will be seen that the rings will be held against circumferential movement at all times. It is to be understood that the pins may be placed in any position in relation to the ends of the spiral packing rings, however they are preferably placed against the ends of the rings and shoulders 18 for allowing free expansion and contraction of the rings. In this form of the invention the expansive action of the helical packing rings is utilized instead of providing the expansion rings 9 shown in the other form.

From the above and referring particularly to Figures 1 to 6 inclusive, it will be seen that means is provided in connection with helical packing rings in spaced relation for exerting an expansive pressure circumferentially on the packing ring for taking up wear and that said means is disposed in a separate ring groove intermediate the packing ring groove and provided with arms which extend into the packing ring grooves, thereby limiting the use of an expansible spring member directly behind or within the expansible ring and obviating the necessity of making the ring grooves of a depth which would weaken the piston.

The invention having been set forth what is claimed as new and useful is:

1. The combination with a piston, spaced piston ring grooves in said piston, spaced expansible piston rings in the grooves an intermediate groove of an expansible member disposed in said intermediate groove and cooperating with the expansible piston rings.

2. The combination with a piston having spaced helically shaped piston rings, spaced grooves in the piston in which the rings are disposed, an intermediate groove, of an expansible member disposed within the intermediate groove between the piston ring grooves and cooperating with the helical piston rings for expanding the same.

3. The combination with a piston having spaced helical piston rings, spaced grooves in which the rings are disposed, means for limiting the rotation of the piston rings in opposite directions, of means for imparting circumferential pressure on said rings, said means comprising an expansible member, a groove in the piston between the piston ring grooves and in which the expansion member is disposed, passages of communication between the expansible member groove and the piston ring grooves, members carried by said expansion ring and extending through the passages of communication, said members engaging the ends of the inner convolutions of the piston rings.

4. The combination with spaced helically shaped piston rings, piston grooves in which said rings are disposed of means for exerting circumferential pressure on the ends of the inner convolutions of the piston rings, said means comprising an expansible annular spring, a groove between the piston ring grooves, said spring having arms, recesses in the piston, said arms extending through said recesses and into engagement with the inner convolutions of the piston rings.

5. The combination with the inner adjacent ends of helical piston rings, a piston, grooves in said piston, means for limited rotation of the rings in opposite directions, of means for exerting circumferential expansive pressure on the rings ends in opposite direction, said means comprising a split annular spring, a groove between the ring grooves and in which the spring is disposed, said spring terminating in upwardly and downwardly extending arms, recesses in the piston in communication with the ring groove said arms extending through said recesses and into engagement with the ends of the inner convolutions of the rings.

6. The combination with spaced helical packing rings, of a piston on which the rings are mounted, of means for exerting expansive pressure circumferentially on the inner convolutions of the ring, said means comprising a split annular spring between the ring grooves, upwardly and downwardly extending arms carried by split annular spring, said arms terminating in outwardly extending arms engaging the inner ends of the inner convolutions of the helical rings.

7. The combination with the inner adjacent ends of helical packing rings, a piston, grooves in said piston and in which the rings are disposed, of means for exerting circumferential pressure on the adjacent ring ends in opposite directions.

In testimony whereof we hereunto affix our signatures.

JAMES LEO AHERN.
LETCHER GILBERT LEDGER.